(12) United States Patent
Yatsuda

(10) Patent No.: US 7,883,113 B2
(45) Date of Patent: Feb. 8, 2011

(54) FRONT VEHICLE BODY STRUCTURE

(75) Inventor: Eiji Yatsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 12/247,490

(22) Filed: Oct. 8, 2008

(65) Prior Publication Data

US 2009/0096253 A1    Apr. 16, 2009

(30) Foreign Application Priority Data

Oct. 10, 2007 (JP) .............................. 2007-264522
Oct. 10, 2007 (JP) .............................. 2007-264593

(51) Int. Cl.
*B62D 21/12* (2006.01)
*B62D 21/00* (2006.01)

(52) U.S. Cl. ................. 280/784; 280/124.109; 280/785; 180/232; 180/311; 296/187.09

(58) Field of Classification Search .......... 280/124.109, 280/784, 785; 180/232, 311, 312; 296/187.09, 296/187.1

See application file for complete search history.

(56) References Cited

U.S. PATENT DOCUMENTS

| | | | | |
|---|---|---|---|---|
| 4,723,791 A | * | 2/1988 | Miura et al. | .......... 280/124.109 |
| 5,048,888 A | * | 9/1991 | Willy et al. | ............. 296/187.03 |
| 5,882,065 A | * | 3/1999 | Koiwa et al. | ........... 296/203.02 |
| 6,619,730 B2 | * | 9/2003 | Porner | ........................ 296/204 |
| 6,679,523 B2 | * | 1/2004 | Yamamoto et al. | .......... 280/785 |
| 6,997,276 B2 | * | 2/2006 | Yoshida et al. | .............. 180/232 |
| 7,213,873 B2 | * | 5/2007 | Murata et al. | ................ 296/204 |
| 7,654,543 B2 | * | 2/2010 | Tanaka et al. | ......... 280/124.109 |

* cited by examiner

*Primary Examiner*—Paul N. Dickson
*Assistant Examiner*—George D. Spisich
(74) *Attorney, Agent, or Firm*—Rankin, Hill & Clark LLP

(57) ABSTRACT

Triangular left and right load transmission members each have a first arm interconnecting a front sub frame and a left or right rear frame, a second arm interconnecting the front sub frame and a left or right side sill, and a third arm interconnecting the left or right side sill and the left or right rear frame. The transmission members each transmit an impact load from the front sub frame to the left or right rear frame via the first arm and to the left or right side sill via the second arm. A cross member spans between the side sills and fixedly connected to the rear frames. Left and right rigid areas are formed by the transmission members, cross member and right rear frames.

4 Claims, 13 Drawing Sheets

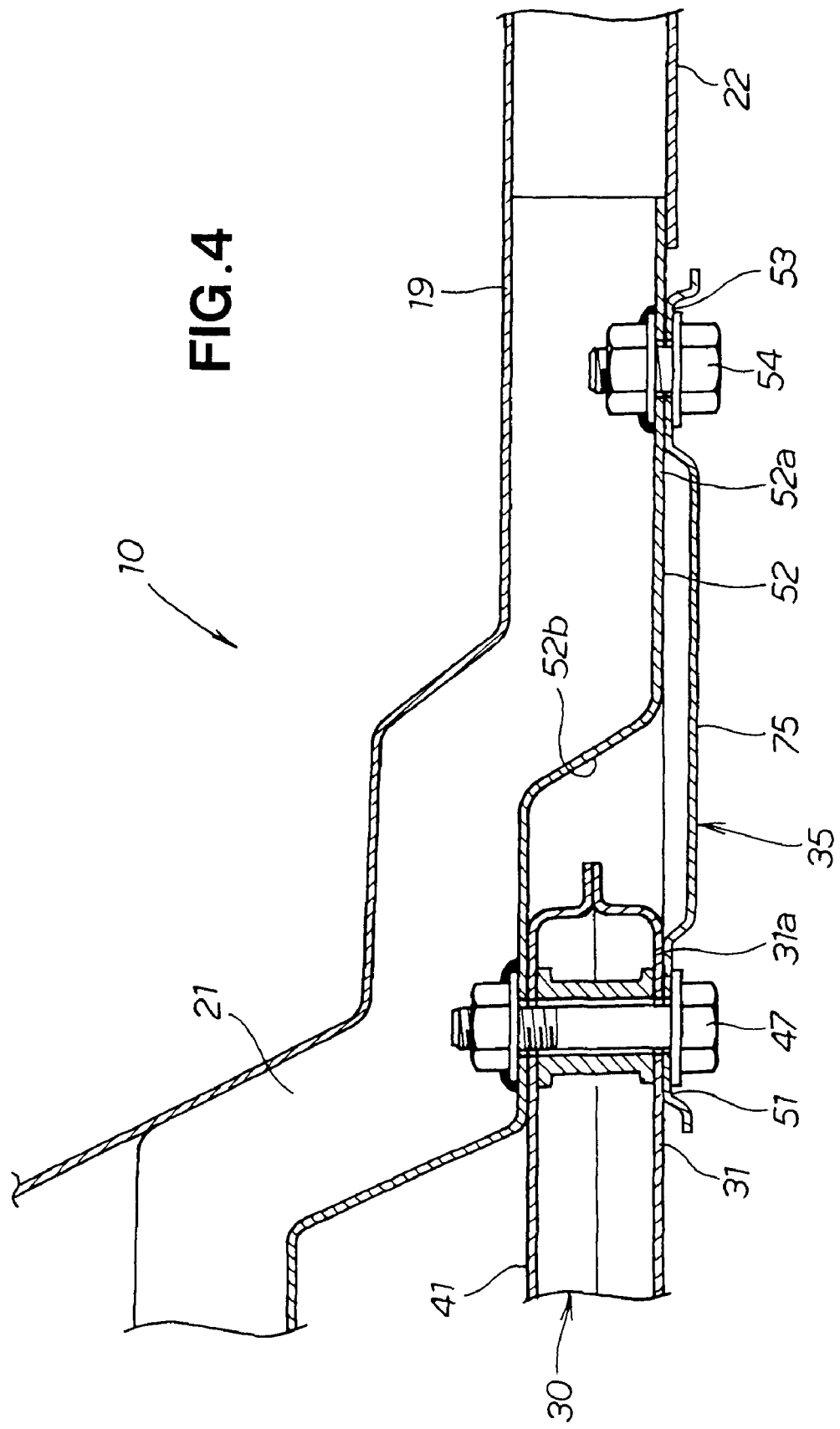

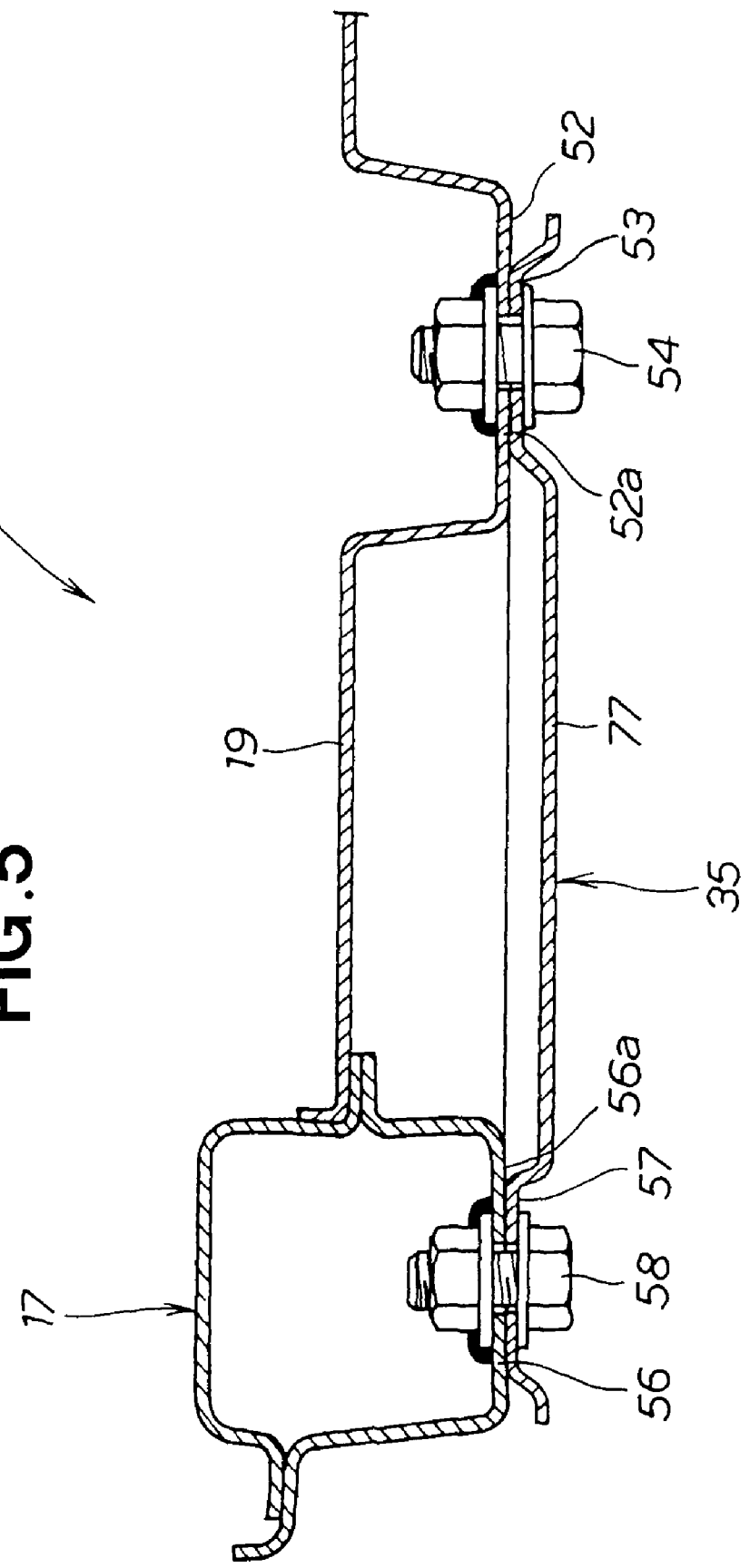

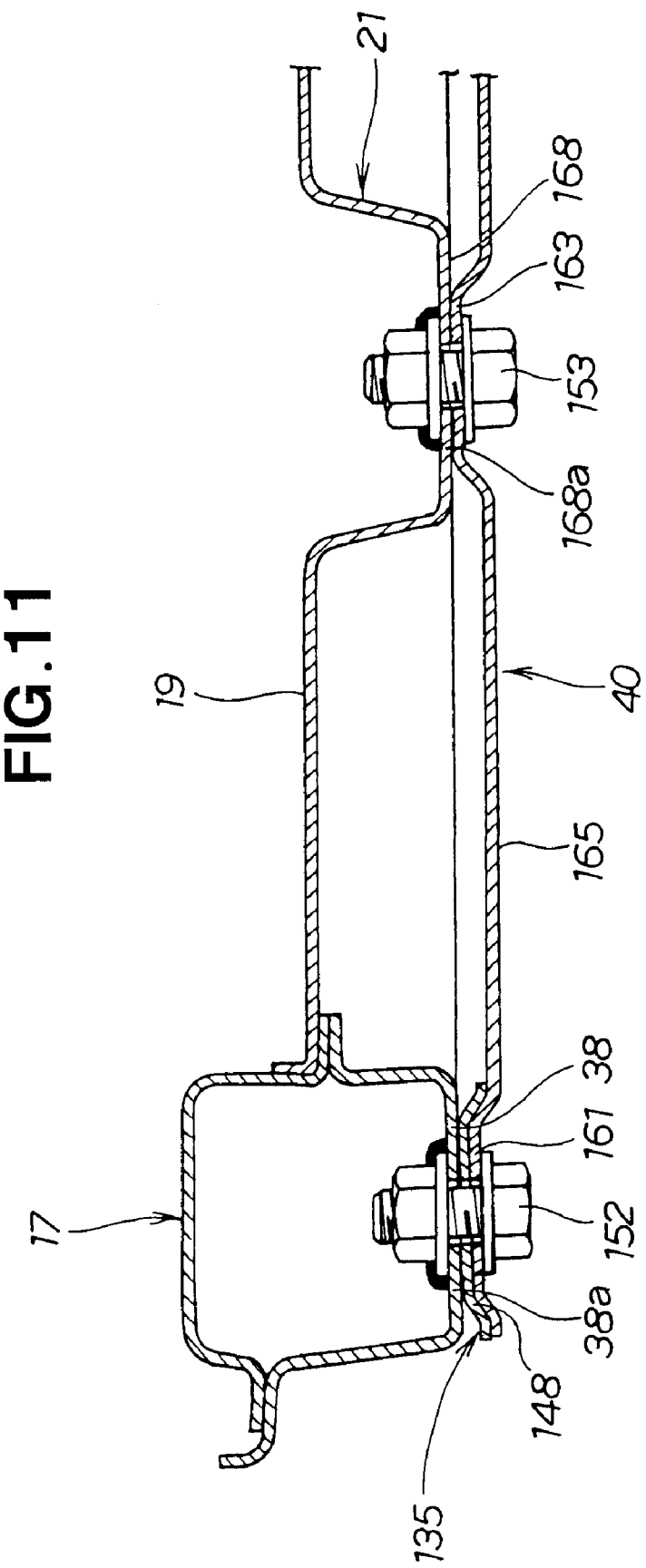

FRONT VEHICLE BODY STRUCTURE

FIELD OF THE INVENTION

The present invention relates to front vehicle body structures including a front sub frame provided beneath left and right front side frames.

BACKGROUND OF THE INVENTION

One example of the conventionally-known vehicle body structures is disclosed in Japanese Patent Application Laid-Open Publication No. 2006-213204 (JP 2006-213204 A), where a reinforcing plate, extending from rear suspension arms across a front floor panel to side sills, is fixed to high-rigidity members, such as the front floor panel, side sills and tunnel members. When an impact load has been applied in a rear-to-front direction of the vehicle body, the vehicle body structure disclosed in JP 2006-213204 A can bear the impact load by means of the reinforcing plate fixed to the high-rigidity members. Thus, it is possible to prevent or minimize displacement of the rear suspension arms to thereby minimize an amount of change in alignment relative to the rear suspensions (namely, change in mounting angle of wheel tires relative to the vehicle body).

Among the conventionally-known front vehicle body structures, constituting a front part of the vehicle body structure, are ones in which left and right front side frames have left and right rear front-side-frame end sections extending from their respective rear ends toward the rear of the vehicle body and a front sub frame is provided beneath the left and right front side frames and left and right rear front-side-frame sections. It is conceivable to achieve an enhanced rigidity of the front vehicle body structures by applying to these structures the reinforcing plate disclosed in JP 2006-213204 A.

When an impact load has been applied to the front of the vehicle body, the impact load transmits toward the rear of the vehicle by way of the left and right front side frames and front sub frame. Because the reinforcing plate disclosed in the No. 2006-213204 publication is fixed to the high-rigidity members, such as the front floor panel, side sills and tunnel members, it can secure an enhanced rigidity. However, the high-rigidity side sills and tunnel members are located at positions offset from the left and right front side frames and left and right side frames, and thus, when an impact load has been applied in the front-to-rear direction of the vehicle body, it would be difficult to efficiently bear the impact load by means of the reinforcing plate.

SUMMARY OF THE INVENTION

In view of the foregoing prior art problems, it is an object of the present invention to provide an improved front vehicle body structure which can efficiently absorb an impact load applied in the front-to-rear direction of In order to accomplish the above-mentioned object, the present invention provides an improved front vehicle body structure which comprises left and right rear frames extending from respective rear end portions of left and right front side frames toward the rear of the vehicle body, left and right outriggers extending from the respective rear end portions of the left and right front side frames outwardly in a width direction of the vehicle body, and left and right side sills extending from the left and right outriggers toward the rear of the vehicle body. The front vehicle body structure further including a front sub frame having left front and rear connection sections and right front and rear connection sections fixedly connected to the left front side frame and left rear frame and to the right front side frame and right rear frame, respectively, and left and right load transmission members fixedly connected to the left rear connection section of the front sub frame. The left rear frame and the left side sill and to the right rear connection section of the front sub frame, the right rear frame and the right side sill, respectively. Each of the left and right load transmission members is in the form of a substantially triangular frame defined by a first arm interconnecting the left or right rear connection section of the front sub frame and the left or right rear frame, a second arm interconnecting the left or right rear connection section of the front sub frame and the left or right side sill, and a third arm interconnecting the left or right side sill and the left or right rear frame. Each of the left and right load transmission members transmits an impact load, applied to the front of the vehicle, from the left or right rear connection section of the front sub frame to the left or right rear frame via the first arm and to the left or right side sill via the second arm.

Each of the left and right load transmission members is in the form of a substantially triangular frame with the first arm interconnecting the left or right rear connection section of the front sub frame and the left or right rear frame and the second arm interconnecting the left or right rear connection section of the front sub frame and the left or right side sill. Thus, an impact load applied to the front of the vehicle body and acting in the front-to-rear direction of the vehicle body can be distributed to the first arm and second arm in each of the left and right load transmission members. Then, the impact load distributed to the first arm can be transmitted to the rear frame, and the impact load distributed to the second arm can be transmitted to the side sill.

Of each of the substantially triangular left and right load transmission members, the second arm interconnects the left or right rear connection section of the front sub frame and the left or right side sill, so that an intersection between a front end portion of the side sill and the left or right outrigger can be enhanced.

Further, with the rear connection section of the front sub frame connected to the rear frame via the first arm and connected to the side sill via the second arm, it is possible to prevent the rear connection section of the front sub frame from being displaced toward the rear of the vehicle body due to an impact load applied in the front-to-rear direction of the vehicle body. By thus preventing the displacement of the rear connection section of the front sub frame, it is possible to minimize an amount of change in alignment relative to front suspensions (namely, change in mounting angle of wheel tires relative to the vehicle body).

In an embodiment, two of three apexes of each of the left and right load transmission members, fixedly connected to the left and right rear connection sections of the front sub frame, left and right rear frames and left and right side sills, are disposed on an imaginary input line of an impact load acting on the front sub frame. The imaginary input line of an impact load is an imaginary line along which an impact load applied to the front of the vehicle body acts in a direction toward the rear of the vehicle body. Thus, an impact load acting on the front sub frame can be transmitted via the load transmission member to the rear of the vehicle body with an even further enhanced efficiency.

Preferably, in each of the left and right load transmission members, the first arm is disposed along the left or right rear frame, and the second arm is disposed along the left or right rear outrigger. The rear frame and first arm can together constitute a transmission path of an impact load. Therefore, the transmission path can have a combined (and hence great)

sectional area of the rear frame and first arm and thus can transmit the impact load with an even further enhanced efficiency. Further, because the second arm is disposed along the outrigger, the outrigger and second arm can together constitute a transmission path of an impact load. Therefore, the transmission path can have a combined (and hence great) sectional area and thus can transmit the impact load with an even further enhanced efficiency.

In an embodiment, each of the left and right rear connection sections is disposed at the same height as a mounting section of the left or right side sill where one of the apexes of the left or right load transmission member is mounted and as a mounting section of the left or right rear frame where another one of the apexes of the left or right load transmission member is mounted. Thus, in case the fastening or connecting state in the rear connection section is canceled or lost due to an impact load having acted in the front-to-rear direction of the vehicle body, the rear connection section is pressed against the mounting sections of the rear frame and side sill. In this way, the impact load can be efficiently borne by the rear frame and side sill.

According to another aspect of the present invention, there is provided an improved front vehicle body structure, which comprises left and right rear frames extending from respective rear end portions of left and right front side frames toward a rear of the vehicle body, left and right outriggers extending from the respective rear end portions of the left and right front side frames outwardly in a width direction of the vehicle body, and left and right side sills extending from the left and right outriggers, respectively, toward the rear of the vehicle body. The front vehicle body structure further including a front sub frame having left front and rear connection sections and right front and rear connection sections fixedly connected to the left front side frame and left rear frame and to the right front side frame and right rear frame, respectively, a left load transmission member having a left front end portion connected to the left rear connection section of the front sub frame and having a left rear end portion connected to the left side sill, a right load transmission member having a right front end portion connected to the right rear connection section of the front sub frame and having a right rear end portion connected to the right side sill, and a cross member spanning between the left side sill and the right side sill and fixedly connected to the left and right rear frames. The cross member having a left connection section interconnecting the left side sill and the left rear frame and a right connection section interconnecting the right side sill and the right rear frame. The left load transmission member, left connection section of the cross member and left rear frame together form a substantially triangular left rigid area, while the right load transmission member, right connection section of the cross member and right rear frame together form a substantially triangular right rigid area.

With the left front and rear end portions of the left load transmission member connected to the left rear connection section of the front sub frame and the left side sill, respectively, and with the right front and rear end portions of the right load transmission member connected to the right rear connection section of the front sub frame and the right side sill, respectively, an impact load applied in the front-to-rear direction of the vehicle body can be distributed to the left and right side sills by way of the left and right load transmission members.

Further, the cross member, spanning between the left side sill and the right side sill and fixedly connected to the left and right rear frames, can enhance rigidity of a floor panel fixed between the left and right sills. In addition, the substantially triangular left rigid area is formed by the left load transmission member, left connection section of the cross member and left rear frame, while the substantially triangular right rigid area is formed by the right load transmission member, right connection section of the cross member and right rear frame. The left rigid area is located rearwardly of the left rear connection section of the front sub frame, and the right rigid area is located rearwardly of the right rear connection section of the front sub frame. In this way, an impact load having acted in the front-to-rear direction of the vehicle body can be distributed toward the rear of the vehicle body by way of the left and right rigid areas, and it is possible to prevent the rear connection sections of the front sub frame from being displaced toward the rear of the vehicle body due to an impact load applied in the front-to-rear direction of the vehicle body. By thus preventing the displacement of the rear connection sections of the front sub frame, it is possible to minimize an amount of change in alignment relative to the front suspensions (namely, change in mounting angle of the wheel tires relative to the vehicle body).

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 4 is a sectional view of the left load transmission member taken along a first arm of the transmission member;

FIG. 5 is a sectional view of the left load transmission member taken along a second arm of the transmission member;

FIG. 11 is a sectional view of a cross member of the second embodiment of the front vehicle body structure;

DETAILED DESCRIPTION OF THE PREFERRED EMBODIMENTS

Throughout the description, the terms "front", "rear", "left" and "right" are used to refer to directions as viewed from a human operator or driver.

Figure 1:
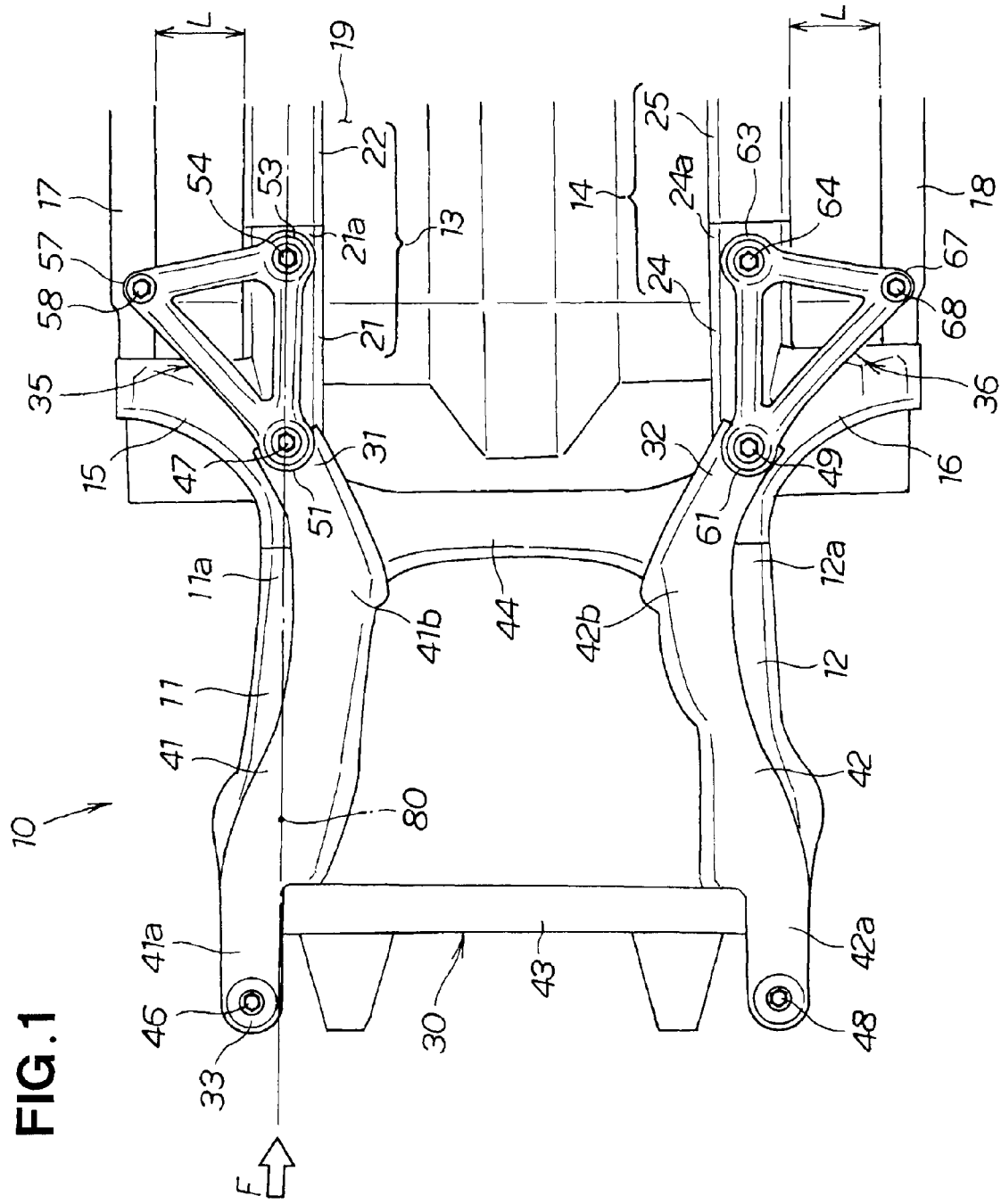
FIG. 1 is a bottom view showing a first embodiment of a front vehicle body structure of the preset invention.
Figure 2:
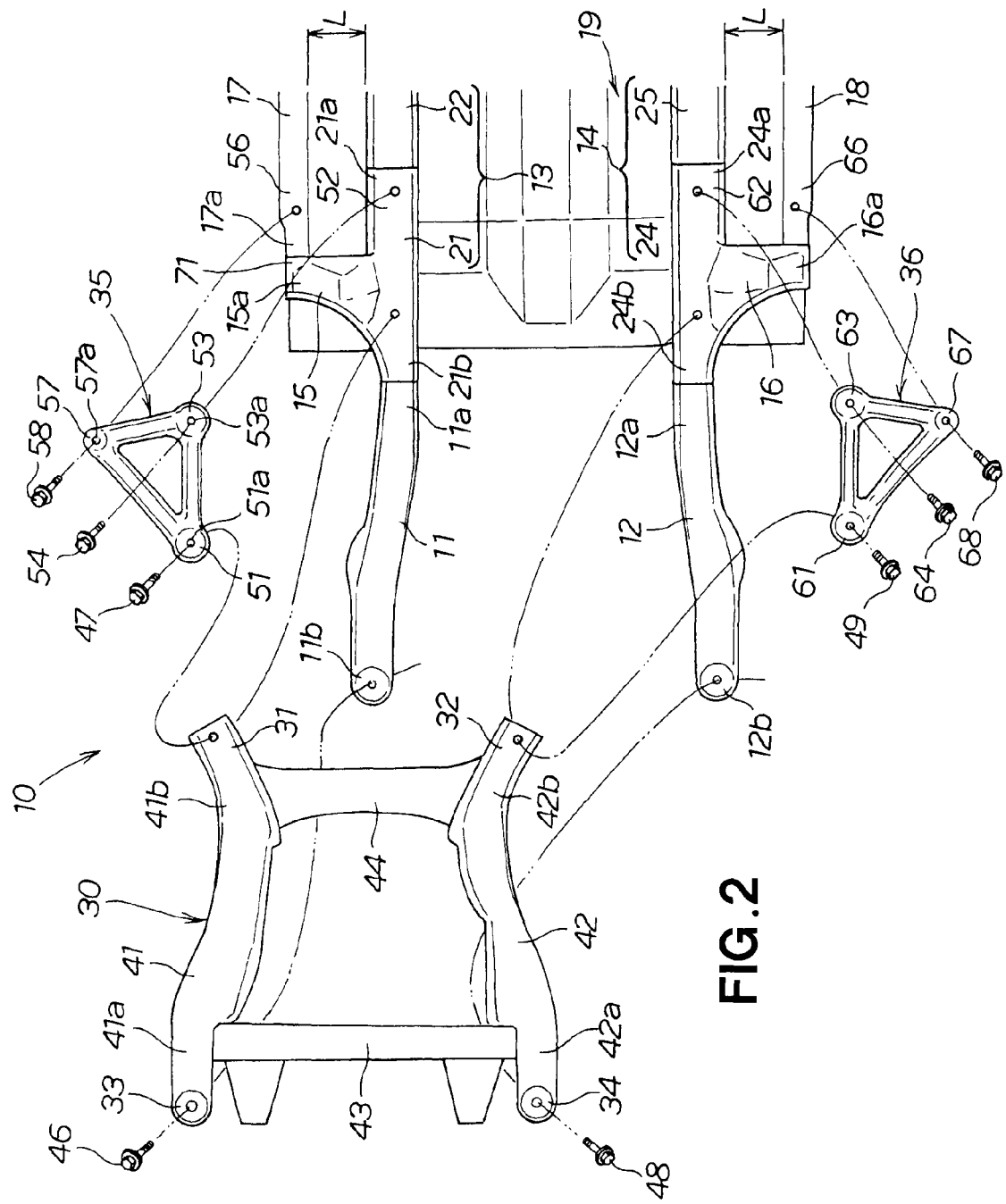
FIG. 2 is an exploded bottom view of the first embodiment of the front vehicle body structure.

FIG. 1 is a bottom view showing a first embodiment of a front vehicle body structure of the preset invention, and FIG. 2 is an exploded bottom view showing the front vehicle body structure 10. The front vehicle body structure 10 includes left and right front side frames 11 and 12 extending in a front-rear direction or length direction of the vehicle body; left and right rear front frames 13 and 14 extending from respective rear end portions 11a and 12a of the left and right front side frames 11 and 12 toward the rear of the vehicle body; left and right outriggers 15 and 16 extending laterally outwardly toward the left and right sides of the vehicle body from the respective rear end portions 11a and 12a of the left and right front side frames 11 and 12; left and right side sills 17 and 18 extending from the left and right outriggers 15 and 16 toward the rear of the vehicle body; and a front floor panel 19 fixed between the left and right side sills 17 and 18.

The left rear front frame 13 includes a left rear front-side-frame end section 21 extending rearwardly (i.e., toward the rear of the vehicle body) from the rear end portion 11a of the left front side frame 11, and a left floor frame 22 extending rearwardly from a rear end portion 21a of the left rear front-side-frame end section 21.

The right rear front frame 14 includes a right rear front-side-frame end section 24 extending rearwardly from the rear end portion 12a of the right front side frame 12, and a right floor frame 25 extending rearwardly from a rear end portion 24a of the right rear front-side-frame end section 24.

The front vehicle body structure 10 further includes: a front sub frame 30 fixedly connected to the left and right front side frames 11 and 12 and left and right rear front-side-frame end sections 21 and 24; a left load transmission member 35 connecting a left rear connection section 31 to the left rear front-side-frame end section 21 and left side sill 17; and a right load transmission member 36 connecting a right rear connection section 32 to the right rear front-side-frame end section 24 and right side sill 18.

With the left rear front-side-frame end section 21 extending rearwardly from the rear end portion 11a of the left front side frame 11 and the left floor frame 22 extending rearwardly from the rear end portion 21a of the left rear front-side-frame end section 21, the left front side frame 11, left rear front-side-frame end section 21 and left floor frame 22 are disposed in a substantially linear configuration.

With the right rear front-side-frame end section 24 extending rearwardly from the rear end portion 12a of the right front side frame 12 and the right floor frame 25 extending rearwardly from the rear end portion 24a of the right rear front-side-frame end section 24, the right front side frame 12, right rear front-side-frame end section 24 and right floor frame 25 are disposed in a substantially linear configuration.

Further, with the left outrigger 15 extending outwardly toward the left side of the vehicle body from the rear end portion 11a of the left front side frame 11 and the left side sill 17 extending from one end 15a of the left outrigger 15 toward the rear of the vehicle body, the left side sill 17 is disposed parallel to the left rear front-side-frame end section 21 and left floor frame 22 with a predetermined interval L therefrom.

Further, with the right outrigger 16 extending outwardly toward the right side of the vehicle body from the rear end portion 12a of the right front side frame 12 and the right side sill 18 extending from one end 16a of the right outrigger 16 toward the rear of the vehicle body, the right side sill 18 is disposed parallel to the right rear front-side-frame end section 24 and right floor frame 25 with a predetermined interval L therefrom.

The front sub frame 30 includes left and right sub side frames 41 and 42 extending toward the rear of the vehicle body, a front cross member 43 disposed between the left and right sub side frames 41 and 42 and fixed to respective front end portions 41a and 42a of the sub side frames 41 and 42, and a rear cross member 44 disposed between the left and right sub side frames 41 and 42 and fixedly connected to respective rear end portions 41b and 42b of the sub side frames 41 and 42. The front sub frame 30 is a substantially rectangular frame formed of the left and right sub side frames 41 and 42 and front and rear cross members 43 and 44.

The left sub side frame 41, which is formed into a gently curved shape along the left front side frame 11, has a left front connection section 33 fixedly connected to a front end portion 11b (FIG. 2) of the left front side frame 11 by means of a bolt 46, and a left rear connection section 31 fixedly connected to a portion of the left rear front-side-frame end section 21 near a front end portion 21b of the section 21 by means of a bolt 47.

The right sub side frame 42, which is formed into a moderately curved shape along the right front side frame 12, has a right front connection section 34 fixedly connected to a front end portion 12b of the right front side frame 12 by means of a bolt 48, and a right rear connection section 32 fixedly connected to the right rear front-side-frame end section 24 near a front end portion 24b of the section 11 by means of a bolt 49.

The left load transmission member 35, which is constructed as a substantially triangular frame, has a front apex portion 51 fixedly connected to the left rear connection section 31 of the left sub side frame 41 by means of a bolt 47, an inner apex portion 53 fixedly connected to a left mounting section 52 of the left rear front-side-frame end section 21 by means of a bolt 54, and an outer apex portion 57 fixedly connected to a left mounting section 56 of the left side sill 17 by means of a bolt 58.

The right load transmission member 36, which is constructed as a substantially triangular frame, has a front apex portion 61 fixedly connected to the right rear connection section 32 of the right sub side frame 42 by means of a bolt 49, an inner apex portion 63 fixedly connected to a right mounting section 62 of the right rear front-side-frame end section 24, and an outer apex portion 67 fixedly connected to a right mounting section 66 of the right side sill 18 by means of a bolt 68.

Because the left and right load transmission members 35 and 36 are provided in left-right symmetrical relation to each other, the following paragraphs primarily describe the left load transmission member 35; it should be noted that the following explanations about the left load transmission member 35 generally apply to the right load transmission member 36 as well.

Figure 3:
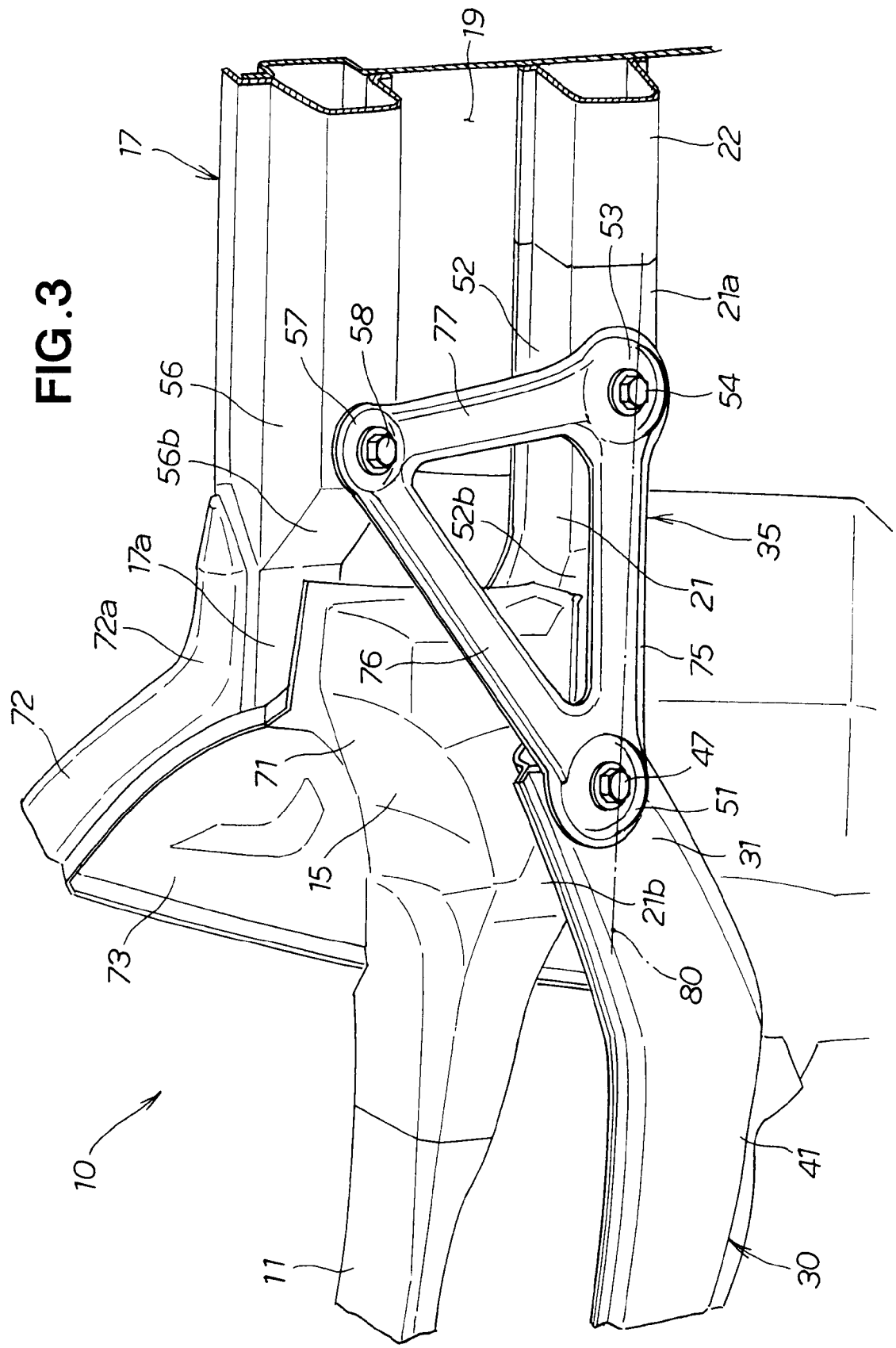
FIG. 3 is a bottom perspective view of a left load transmission member in the first embodiment of the front vehicle body structure.

FIG. 3 is a bottom perspective view of the left load transmission member 35 of the front vehicle body structure of the invention. Left front pillar 72 has a proximal end portion 72a fixedly connected to an intersection 71 between a front end portion 17a of the left side sill 17 and the left outrigger 15 (see also FIG. 2). Lower dashboard member 73 is fixed to and along the left front pillar 72.

Left mounting section 56 is provided on the front end portion 17a of the left side sill 17, and a left mounting section 52 is provided on a rear end portion 21a of the left rear front-side-frame end section 21.

The left load transmission member 35 is fixedly connected to the left mounting section 56 of the left side sill 17, left mounting section 52 of the left rear front-side-frame end section 21 and left rear connection section 31 of the left sub side frame 41, by means of bolts 47, 54 and 58.

The left load transmission member 35 includes: first to third arms 75-77 defining the substantially triangular frame; the front apex portion 51 having the first and second arms 75 and 76 connected thereto; the inner apex portion 53 having the first and third arms 75 and 77 connected thereto; and the outer apex portion 57 having the second and third arms 76 and 77 connected thereto.

The front apex portion 51 has a mounting hole 51a formed therein as shown in FIG. 2, and it is fastened to the left rear connection section 31 of the left sub side frame 41 by means of the bolt 47 inserted through the hole 51a. The bolt 47 is a fastener member that fastens the front apex portion 51 and left rear connection section 31 of the front sub frame 30 to the portion of the left rear front-side-frame end section 21 near the front end portion 21b.

The inner apex portion 53 has a mounting hole 53a formed therein as shown in FIG. 2, and it is fastened to the left mounting section 52 of the left rear front-side-frame end section 21 by means of the bolt 54 inserted through the hole 53a.

The outer apex portion 57 has a mounting hole 57a formed therein as shown in FIG. 2, and it is fastened to the left mounting section 56 of the left side sill 17 by means of the bolt 58 inserted through the hole 57a.

The front apex portion 51 and inner apex portion 53 are disposed on an imaginary input line 80 of an impact load (see also FIG. 1). As shown in FIG. 1, the imaginary input line 80 of an impact load is an imaginary line along which an impact load F applied to the left sub side frame 41 of the front sub frame 30 acts in a direction toward the rear of the vehicle body.

The first arm 75 is a member interconnecting the left rear connection section 31 of the left sub side frame 41 and the left mounting section 52 of the left rear front-side-frame end section 21. The first arm 75 is disposed along the left rear front-side-frame end section 21 for a reason to be discussed later.

The second arm 76 is a member interconnecting the left rear connection section 31 of the front sub frame 30 and the left mounting section 56 of the left side sill 17. With the second arm 76 interconnecting the left rear connection section 31 of the front sub frame 30 and the left mounting section 56 of the left side sill 17, rigidity of the intersection 71 between the front end portion 17a of the left side sill 17 and the left outrigger 15 can be effectively reinforced, so that the base portion 72a of the left front pillar 72 fixed to the intersection 71 between the front end portion 17a of the left side sill 17 and the left outrigger 15 can have an enhanced rigidity. The second arm 76 is disposed along the left outrigger 15 (see also FIG. 1) for a reason to be discussed later.

The third arm 77 is a member interconnecting the left mounting section 56 of the left side sill 17 and the left mounting section 52 of the left rear front-side-frame end section 21.

With the first arm 75 disposed along the left rear front-side-frame end section 21 and the second arm 76 disposed along the left outrigger 15, an impact load applied to the front of the vehicle body and acting in the front-to-rear direction of the vehicle body can be distributed to the first arm 75 and second arm 76 of the left load transmission member 35.

Further, with the first arm 75 connected to the left mounting section 52 of the left rear front-side-frame end section 21, the impact load distributed to the first arm 75 can be transmitted to the left rear front-side-frame end section 21.

Further, with the second arm 76 connected to the left mounting section 56 of the left side sill 17, the impact load distributed to the second arm 76 can be transmitted to the left side sill 17.

Because the first arm 75 is disposed along the left rear front-side-frame end section 21 as noted above, both of the left rear front-side-frame end section 21 and first arm 75 can together constitute a transmission path of an impact load; therefore, the transmission path can have a combined (and hence great) sectional area of the end section 21 and first arm 75 and thus can transmit the impact load with an even further enhanced efficiency.

Further, because the second arm 76 is disposed along the left outrigger 15 as noted above, both of the left outrigger 15 and second arm 76 can together constitute a transmission path of an impact load; therefore, the transmission path can have a combined (and hence great) sectional area and thus can transmit the impact load with an even further enhanced efficiency.

In addition, the left rear connection section 31 of the left sub side frame 41 is not only connected via the first arm 75 to the left rear front-side-frame end section 21 but also connected via the second arm 76 to the left side sill 17. Thus, when an impact load has been applied to the front of the vehicle body to act in the front-to-rear direction of the vehicle body, it is possible to prevent the left rear connection section 31 of the left sub side frame 41 from being displaced toward the rear of the vehicle body due to the applied impact load.

FIG. 4 is a sectional view of the left load transmission member 35 taken along the first arm 75, and FIG. 5 is a sectional view of the left load transmission member 35 taken along the third arm 77.

The left rear connection section 31 of the left sub side frame 41 is disposed at the same height as not only the left mounting section 52 of the left rear front-side-frame end section 21 but also the left mounting section 56 of the left side sill 17.

Namely, a mounting surface 31a of the left rear connection section 31 of the left sub side frame 41, mounting surface 52a of the left mounting section 52 of the left rear front-side-frame end section 21 and mounting surface 56a of the left mounting section 56 of the left side sill 17 are located generally flush with one another.

The mounting surface 31a of the left rear connection section 31 of the left sub side frame 41 is a surface on which is mounted the front apex portion 51 of the left load transmission member 35. The mounting surface 52a of the left mounting section 52 of the left rear front-side-frame end section 21 is a surface on which is mounted the inner apex portion 53 of the left load transmission member 35. The mounting surface 56a of the left mounting section 56 of the left side sill 17 is a surface on which is mounted the outer apex portion 57 of the left load transmission member 35.

With the left rear connection section 31 of the left sub side frame 41 disposed at the same height as the left mounting section 52 of the left rear front-side-frame end section 21, the left rear connection section 31 is opposed to the front end portion 52b (FIG. 4) of the left mounting section 52.

Further, with the left rear connection section 31 of the left sub side frame 41 disposed at the same height as the left mounting section 56 of the left side sill 17, the left rear connection section 31 is opposed to the front end portion 56b (FIG. 3) of the left mounting section 56. The reason why the left rear connection section 31 is opposed to the front end portion 52b of the left mounting section 52 and to the front end portion 56b of the left mounting section 56 will be detailed later.

Figure 6A:
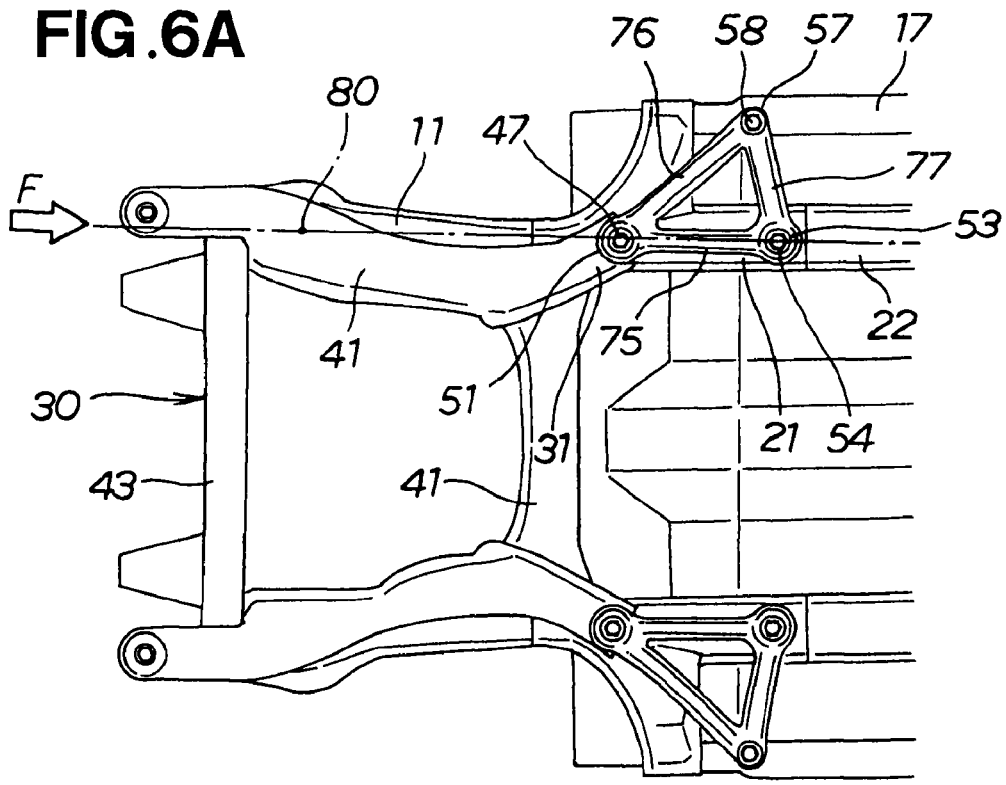
FIGS. 6A and 6B are views explanatory of how an impact load acts on the first embodiment of the front vehicle structure.
Figure 6B:
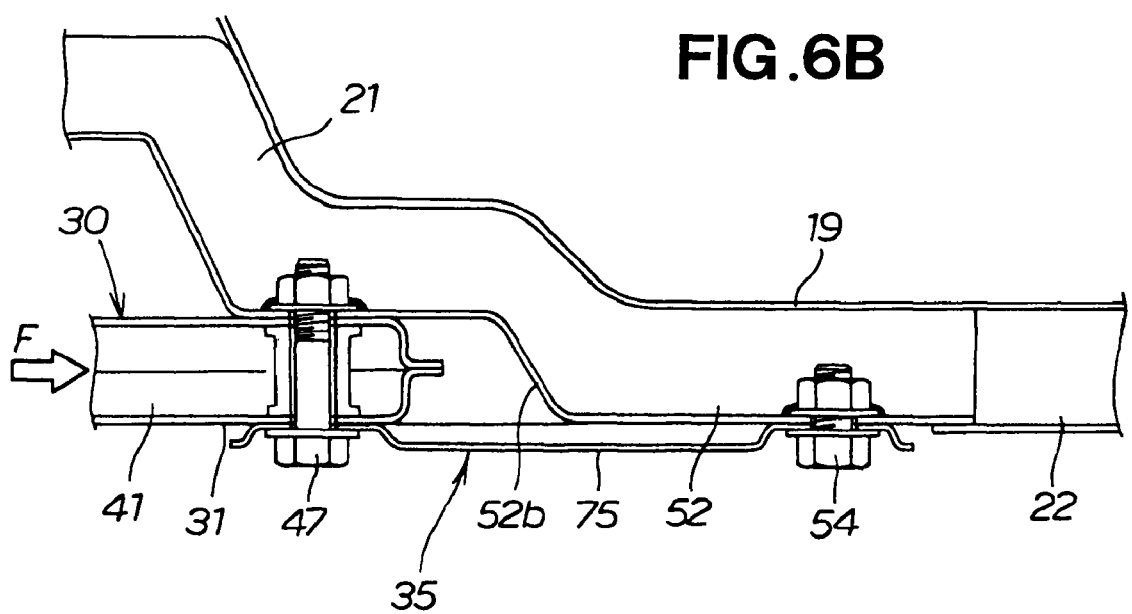

FIGS. 6A and 6B are views explanatory of how an impact load acts on the front vehicle structure 10. When an impact load F has been applied to the front of the vehicle body to act in the front-to-rear direction of the vehicle body, the applied impact load F can be distributed to the first and second arms 75 and 76. Then, the impact load distributed to the first arm 75 can be transmitted to the left rear front-side-frame end section 21, while the impact load distributed to the second arm 76 can be transmitted to the left side sill 17.

The front apex portion 51 and inner apex portion 53 of the left load transmission member 35 are disposed on the imaginary input line 80 of the impact load F having acted on the left side frame 41, and thus, the impact load F having acted on the left side frame 41 can be efficiently transmitted toward the rear of the vehicle body by way of the first arm 75 of the left load transmission member 35.

Further, with the left rear connection section 31 of the left sub side frame 41 not only connected to the left rear front-side-frame end section 21 via the first arm 75 but also connected to the left side sill 17 via the second arm 76 as noted above, it is possible to prevent the left rear connection section 31 of the left sub side frame 41 from being displaced toward the rear of the vehicle body due to the applied impact load.

By thus preventing the displacement of the left rear connection section 31 of the left sub side frame 41 (so called "inclination of the front sub frame 30"), it is possible to minimize an amount of change in alignment relative to not-shown front suspensions (namely, change in mounting angle of wheel tires relative to the vehicle body).

In addition, by preventing the inclination of the front sub frame 30, it is possible to eliminate a need to separately provide a stay for preventing the inclination of the front sub frame 30 as was necessary with the conventionally-known front vehicle body structures. Thus, the instant embodiment can reduce the number of necessary component parts and hence the overall weight of the front vehicle body structure 10.

As shown in FIG. 6B, the left rear connection section 31 is opposed to the front end portion 52b of the left mounting section 52 and to the front end portion 56b (FIG. 3) of the left mounting section 56. Thus, in case the fastening or connecting state in the left rear connection section 31 is canceled or lost due to the impact load F having acted in the front-to-rear direction of the vehicle body, the left rear connection section 31 is pressed against the front end portion 52b of the left mounting section 52 of the left rear front-side-frame end section 21 and the front end portion 56b of the left mounting section 56 of the left side sill 17. In this way, the impact load F can be efficiently borne by the front end portion 168b of the left mounting section 168 of the left rear front-side-frame end section 21 and the front end portion of the left mounting section 56 of the left side sill 17.

Whereas the first embodiment of the present invention has been described in relation to the case where the left and right load transmission members 35 and 36 are each constructed as an integral (or one-piece) triangular frame, the present invention is not so limited. For example, the first to third arms 75-77 may be in the form of separate arms, and each of the left and right load transmission members 35 and 36 may be constructed by combining together these arms 75-77 into a single substantially triangular frame, because this modification too can achieve the same advantageous benefits as the above-described first embodiment.

Figure 7:
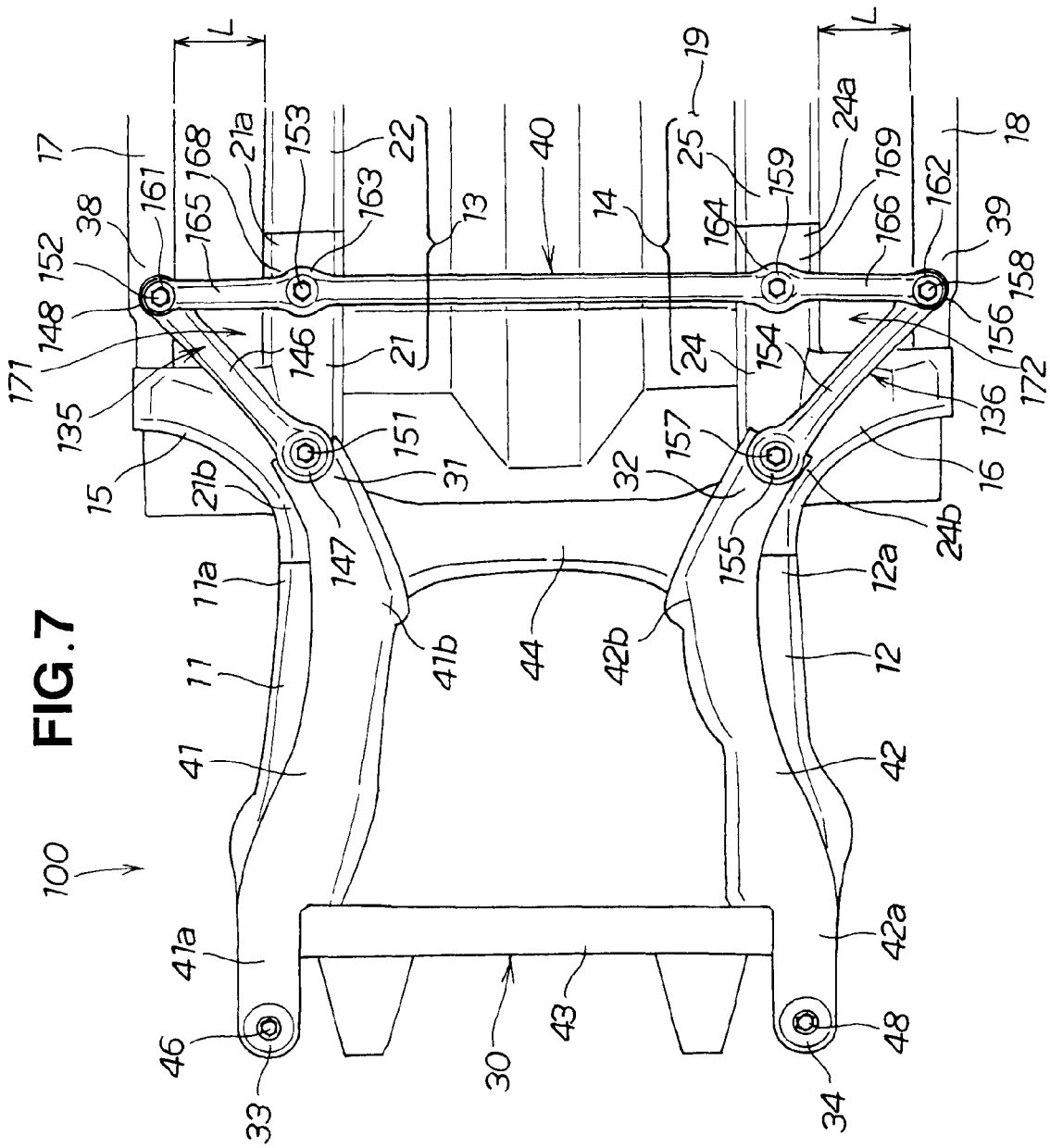
FIG. 7 is a bottom view showing a second embodiment of the front vehicle body structure of the preset invention.
Figure 8:
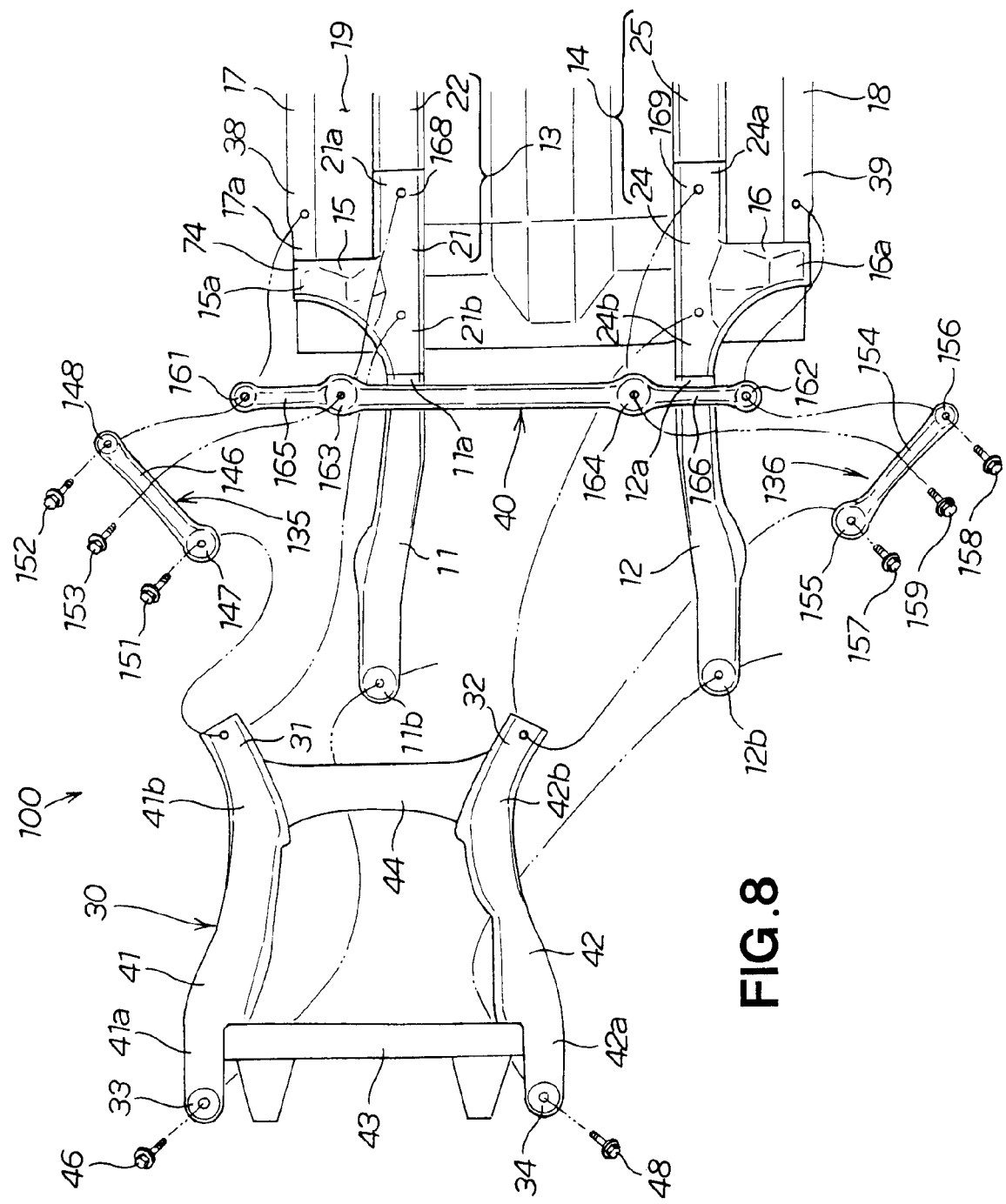
FIG. 8 is an exploded bottom view of the second embodiment of the front vehicle body structure.

FIG. 7 is a bottom view showing a second embodiment of the front vehicle body structure of the preset invention, and FIG. 8 is an exploded bottom view showing the front vehicle body structure 100. Similar elements to those in the first embodiment of the wiper apparatus 10 are indicated by the same reference numerals and characters as used for the first embodiment 10 and will not be described here to avoid unnecessary duplication.

The second embodiment of the front vehicle body structure 100 is similar to the first embodiment 10, except that left and right load transmission members 135 and 136 are provided in place of the left and right load transmission members 35 and 36 provided in the first embodiment of the wiper apparatus 10.

The left load transmission member 135 interconnects the left rear connection section 31 of the front sub frame 30 and the left side sill 17, and the right load transmission member 136 interconnects the right rear connection section 32 of the front sub frame 30 and the right side sill 18. The front vehicle body structure 100 also includes the cross member 40 spanning between a left mounting section 38 of the left side sill 17 and a right mounting section 39 of the right side sill 18.

The left sub side frame 41, which is formed into a gently curved shape along the left front side frame 11, has the left front connection section 33 fixedly connected to the front end portion 11b of the left front side frame 11 by means of a bolt 46 and the left rear connection section 31 fixedly connected to a portion of the left rear front-side-frame end section 21 near the front end portion 21b of the section 21 by means of a bolt 151.

The right sub side frame 42, which is formed into a gently curved shape along the right front side frame 12, has the right front connection section 34 fixedly connected to the front end portion 12b of the right front side frame 12 by means of a bolt 48 and the right rear connection section 32 fixedly connected to a portion of the right rear front-side-frame end section 24 near the front end portion 24b of the section 24 by means of a bolt 157.

The left load transmission member 135 has a straight left arm 146 disposed between the left rear connection section 31 of the front sub frame 30 and the left side sill 17, a left front end portion 147 fastened to the left rear connection section 31 by means of the bolt 151, and a left rear end portion 148 fastened to the left mounting section 38 of the left side sill 17 by means of a bolt 152.

The bolt 151 fastens both of the left front end portion 147 and left rear connection section 31 to the portion of the left rear front-side-frame end section 21 near the front end portion 21b. The bolt 152 fastens both of the left rear end portion 148 and left end portion 161 of the cross member 40 to the left mounting section 38 of the left side sill 17.

The right load transmission member 136 has a straight right arm 154 disposed between the left rear connection section 32 of the front sub frame 30 and the right side sill 18, a right front end portion 155 fastened to the right rear connection section 32 of the front sub frame 30 by means of the bolt 157, and a right rear end portion 156 fastened to the right mounting section 39 of the right side sill 18 by means of a bolt 158.

The bolt 157 fastens both of the right front end portion 155 and right rear connection section 32 to the portion of the right rear front-side-frame end section 24 near the front end portion 24b. The bolt 158 fastens both of the right rear end portion 156 and right end portion 162 of the cross member 40 to the right mounting section 39 of the right side sill 18.

The cross member 40, which is a straight member spanning between the left mounting section 38 of the left side sill 17 and the right mounting section 39 of the right side sill 18, has the left end portion 161 fastened to the left mounting section 38 of the left side sill 17 by means of the bolt 152, the right end portion 162 fastened to the right mounting section 39 of the right side sill 18 by means of the bolt 158, a left fixed portion 163 fastened to a left mounting section 168 of the left rear front-side-frame end section 21 by means of a bolt 153, and a right fixed portion 164 fastened to a right mounting section 169 of the right rear front-side-frame end section 24 by means of a bolt 159.

The cross member 40, spanning between the left mounting section 38 of the left side sill 17 and the right mounting section 39 of the right side sill 18, is fixed not only to the left mounting section 168 of the left rear front-side-frame end section 21 but also to the right mounting section 169 of the right rear front-side-frame end section 24. In this way, the rigidity of the front floor panel 19 fixed between the left and right side sills 17 and 18 can be significantly enhanced by the cross member 40.

The cross member 40 also has left and right connection sections 165 and 166. The left connection section 165 interconnects the left mounting section 38 of the left side sill 17 and the left mounting section 168 of the left rear front-side-frame end section 21. The right connection section 166 interconnects the right mounting section 39 of the right side sill 18 and the right mounting section 169 of the right rear front-side-frame end section 24.

With the left connection section 165 interconnecting the left mounting section 38 of the left side sill 17 and the left mounting section 168 of the left rear front-side-frame end section 21, the second embodiment of the front vehicle body structure 100 provides a substantially triangular left rigid area 171 formed by the left connection section 165, left load transmission member 135 and left rear front-side-frame end section 21.

With the right connection section 166 interconnecting the right mounting section 39 of the right side sill 18 and the right mounting section 169 of the right rear front-side-frame end section 24, the second embodiment of the front vehicle body structure 100 provides a substantially triangular right rigid area 172 formed by the right connection section 166, right load transmission member 136 and right rear front-side-frame end section 24.

Because the left and right load transmission members 135 and 136 are provided in left-right symmetrical relation to each other, the following paragraphs primarily describe the left load transmission member 135; it should be noted that the following explanations about the left load transmission member 135 generally apply to the right load transmission member 36 as well.

Figure 9:
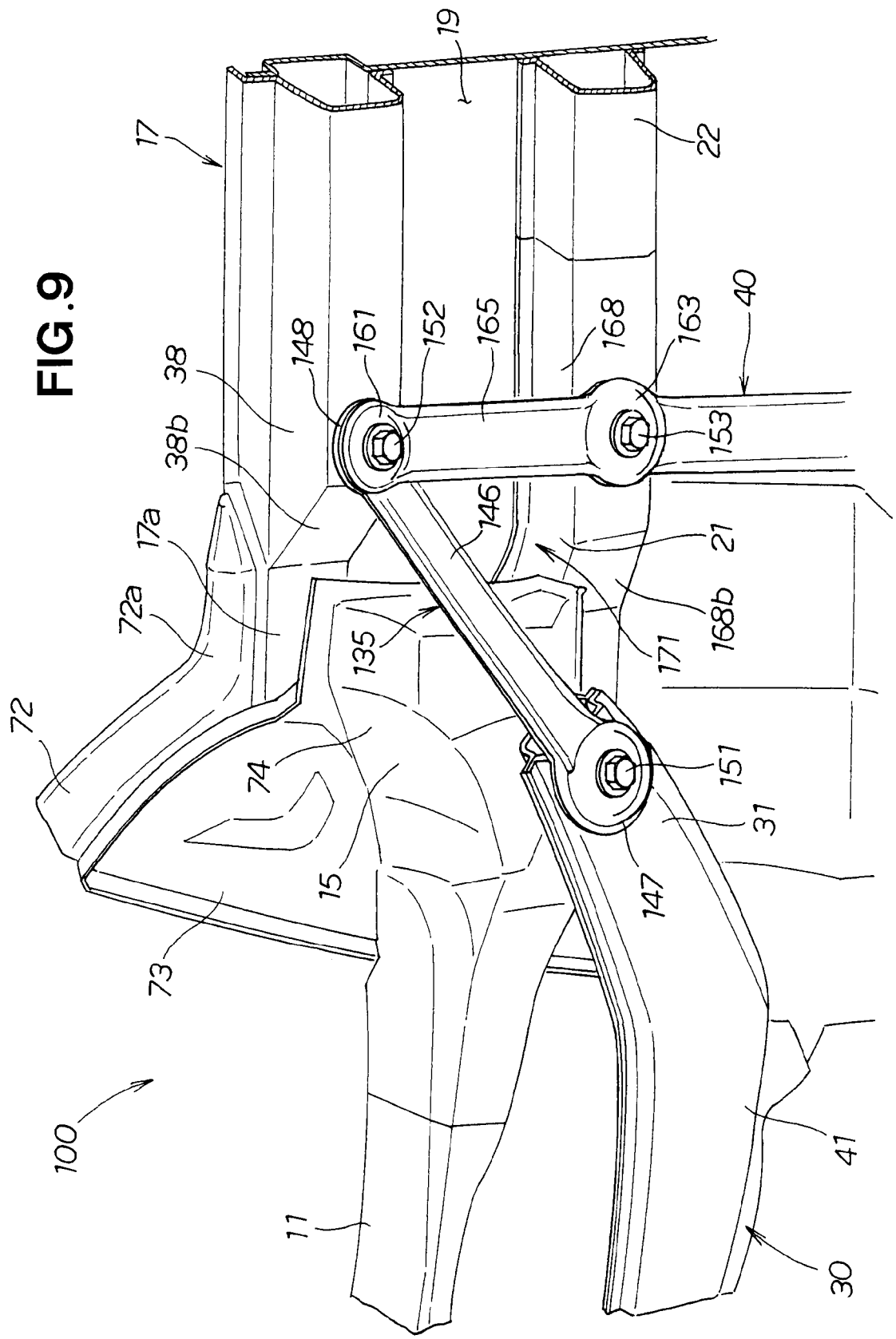
FIG. 9 is a perspective view of a left load transmission member and left connection section of a cross member in the second embodiment of the front vehicle body structure.

FIG. 9 is a perspective view of the left load transmission member 135 in the second embodiment of the front vehicle body structure 100. The base portion 72a of the left front pillar 72 is fixed to an intersection 74 between the front end portion 17a of the left side sill 17 and the left outrigger 15 (see also FIG. 8). The lower dashboard member 73 is fixed to and along the left front pillar 72.

The left mounting section 38 of the left side sill 17 is provided on the front end portion 17a of the left side sill 17. The left load transmission member 135 is fixedly connected to the left mounting section 38 and left rear connection section 31 by means of the bolts 151 and 152.

In the left load transmission member 135, the straight left arm 146 is disposed between the left rear connection section 31 of the front sub frame 30 and the left side sill 17, the left front end portion 147 is fastened to the left rear connection section 31 by means of the bolt 151, and the left rear end portion 148 and left end portion 161 are fastened together by means of the bolt 152.

With the left load transmission member 135 interconnecting the left rear connection section 31 of the left sub side frame 41 and the left mounting section 38 of the left side sill 17, the intersection 74 between the front end portion 17a of the left side sill 17 and the left outrigger 15 can be effectively reinforced, so that the base portion 72a of the left front pillar 72 fixed to the intersection 74 between the front end portion 17a of the left side sill 17 and the left outrigger 15 can secure an enhanced rigidity.

Further, with the left load transmission member 135 interconnecting the left rear connection section 31 of the left sub side frame 41 and the left mounting section 38 of the left side sill 17, an impact load applied to the front of the vehicle body to act in the front-to-rear direction of the vehicle body can be distributed to the left side sill 17 by way of the left load transmission member 135. Besides, with the left rear connection section 31 of the left sub side frame 41 and the left mounting section 38 of the left side sill 17 interconnected via the left load transmission member 135, the left load transmission member 135 can be disposed along the left outrigger 15.

With the left load transmission member 135 disposed along the left outrigger 15 as noted above, the left outrigger 15 and load transmission member 135 can together constitute an impact load transmission path having a combined (and hence great) sectional area of the left load transmission member 135 and left outrigger 15, and thus, an impact load applied can be transmitted through the great sectional area of the transmission path with a significantly enhanced efficiency.

The left end portion 161 of the cross member 40 is fastened, together with the left rear end portion 148, to the left mounting section 38 of the left side sill 17 by means of the bolt 152, and the left fixed portion 163 of the cross member 40 is fastened to the left mounting section 168 of the left rear front-side-frame end section 21 by means of the bolt 153. Thus, the left connection section 165 of the cross member 40 can interconnect the left mounting section 38 of the left side sill 17 and the left mounting section 168 of the left rear front-side-frame end section 21.

The left connection section 165, left load transmission member 135 and left rear front-side-frame end section 21 together form the substantially triangular left rigid area 171, and when an impact load has been applied to the front of the vehicle body to act in the front-to-rear direction of the vehicle body, the applied impact load can be efficiently distributed toward the rear of the vehicle body by way of the left rigid area 171.

Further, with the left rigid area 171 located rearwardly of the left rear connection section 31 of the left sub side frame 41, it is possible to prevent the left rear connection section 31 of the left sub side frame 41 from being displaced toward the rear of the vehicle body due to the applied impact load.

Figure 10:
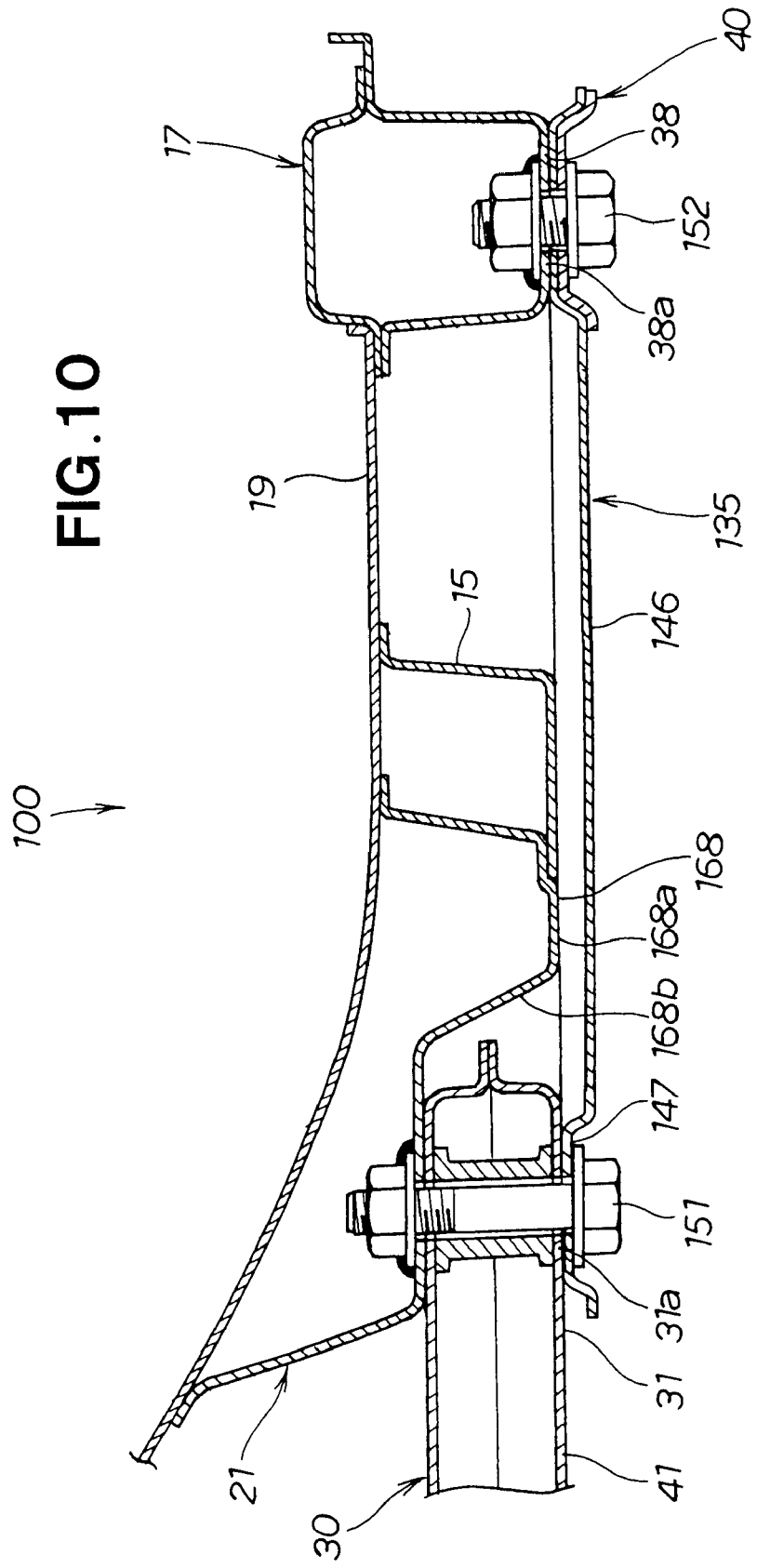
FIG. 10 is a sectional view of the left load transmission member of the second embodiment of the front vehicle body structure.

FIG. 10 is a sectional view of the left load transmission member 135, and FIG. 11 is a sectional view of the cross member 40.

The left rear connection section 31 of the left sub side frame 41 is disposed at the same height as not only the left mounting section 168 of the left rear front-side-frame end section 21 but also the left mounting section 38 of the left side sill 17.

Namely, the mounting surface 31a of the left rear connection section 31 of the left sub side frame 41, mounting surface 168a of the left mounting section 168 of the left rear front-side-frame end section 21 and mounting surface 38a of the left mounting section 38 of the left side sill 17 are located generally flush with one another.

The mounting surface 31a of the left rear connection section 31 of the left sub side frame 41 is a surface on which is mounted the left front end portion 147 of the left load transmission member 135. The mounting surface 168a of the left mounting section 162 of the left rear front-side-frame end section 21 is a surface on which is mounted the left fixed portion 163 of the cross member 40 (see FIG. 11). The mounting surface 38a of the left mounting section 38 of the left side sill 17 is a surface on which are mounted the outer apex portion 148 of the left load transmission member 135 and left end portion 161 of the cross member 40.

With the left rear connection section 31 of the left sub side frame 41 disposed at the same height as the left mounting section 168 of the left rear front-side-frame end section 21, the left rear connection section 31 is opposed to a front end portion 168b (FIG. 10) of the left mounting section 168.

Further, with the left rear connection section 31 of the left sub side frame 41 disposed at the same height as the left mounting section 38 of the left side sill 17, the left rear connection section 31 is opposed to a front end portion 38b (FIG. 9) of the left mounting section 38. The reason why the left rear connection section 31 is opposed to the front end portion 168b of the left mounting section 168 and to the front end portion 38b of the left mounting section 38 will be detailed later.

Figure 12A:
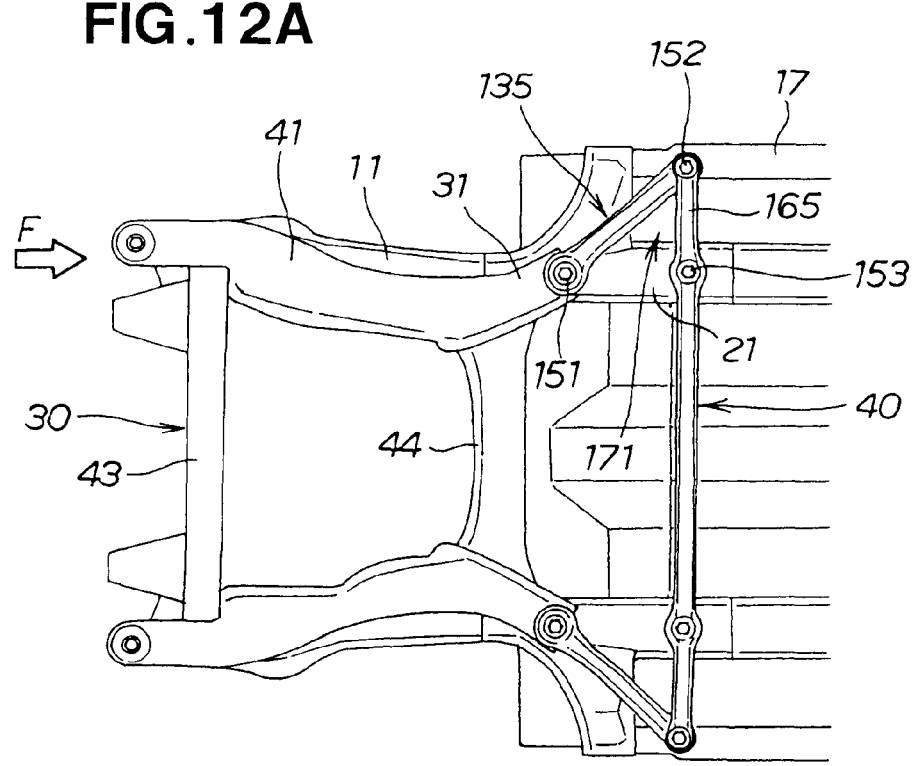
FIGS. 12A and 12B are views explanatory of how an impact load acts on the second embodiment of the front vehicle structure.
Figure 12B:
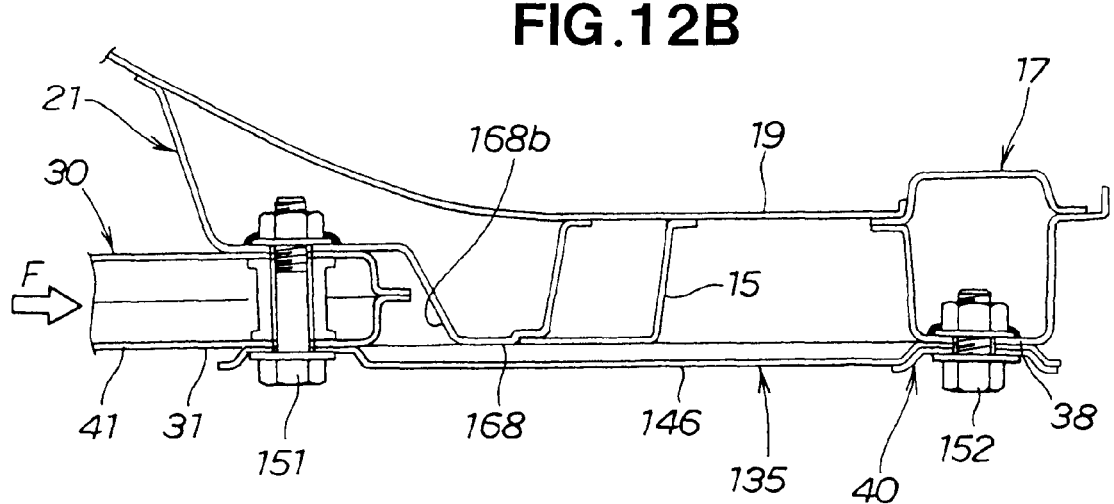

FIGS. 12A and 12B are views explanatory of how an impact load acts on the second embodiment of the front vehicle structure 100. When an impact load F has been applied to the front of the vehicle body to act in the front-to-rear direction of the vehicle body, the applied impact load F can be distributed to the left transmission member 135. Then, the impact load distributed to the left transmission member 135 can be transmitted to the left side sill 17.

Further, with the left rigid area 171 located rearwardly of the left rear connection section 31 of the left sub side frame 41, it is possible to prevent the left rear connection section 31 of the left sub side frame 41 from being displaced toward the rear of the vehicle body due to the applied impact load F.

By thus preventing the displacement of the left rear connection section 31 of the left sub side frame 41 (so called "inclination of the front sub frame 30"), it is possible to minimize the amount of change in alignment relative to the not-shown front suspensions (namely, change in mounting angle of the wheel tires relative to the vehicle body).

In addition, by preventing the inclination of the front sub frame 30, it is possible to eliminate a need to separately provide a stay for preventing the inclination of the front sub frame 30 as was necessary with the conventionally-known front vehicle body structures. Thus, the instant embodiment can reduce the number of necessary component parts and hence the overall weight of the front vehicle body structure 100.

As shown in FIG. 12B, the left rear connection section 31 is opposed to the front end portion 168b of the left mounting section 168 and to the front end portion 38b of the left mounting section 38 of the left side sill 17. Thus, in case the fastening or connecting state in the left rear connection section 31 is canceled or lost due to the impact load F having acted in the front-to-rear direction of the vehicle body, the left rear connection section 31 is pressed against the front end portion 168b of the left mounting section 168 of the left rear front-side-frame end section 21 and the front end portion 38b of the left mounting section 38 of the left side sill 17. In this way, the impact load F can be efficiently borne by the front end portion 168b of the left mounting section 168 of the left rear front-side-frame end section 21 and the front end portion 38b of the left mounting section 38 of the left side sill 17.

Figure 13:
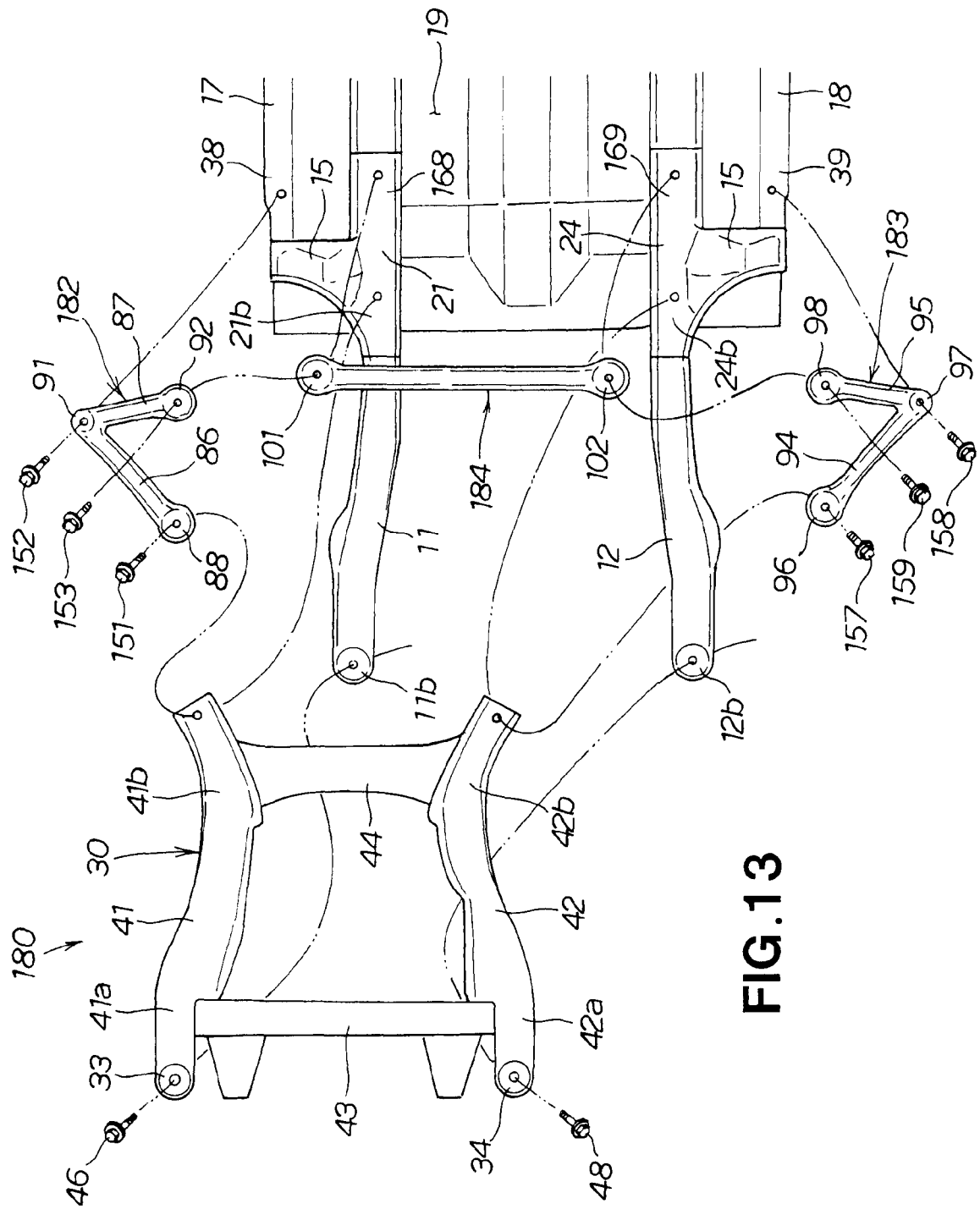
FIG. 13 is an exploded bottom view showing a third embodiment of the front vehicle body structure of the preset invention.

FIG. 13 is an exploded bottom view showing a third embodiment of the front vehicle body structure 180 of the preset invention. Similar elements to those in the second embodiment of the wiper apparatus 100 are indicated by the same reference numerals and characters as used for the second embodiment and will not be described here to avoid unnecessary duplication.

The third embodiment of the front vehicle body structure 180 is similar to the second embodiment 100, except that the left and right load transmission members 182 and 183 are provided in place of the left and right load transmission members 135 and 136 of the second embodiment 100 and a cross member 184 is provided in place of the cross member 40 of the second embodiment 100.

The left load transmission member 182 has a left arm 86 interconnecting the left rear connection section 31 of the left sub side frame 41 and the left mounting section 38 of the left side sill 17, and a left connection section 87 interconnecting the left mounting section 38 of the left side sill 17 and the left mounting section 168 of the left rear front-side-frame end section 21. The left load transmission member 182 has a substantially L shape defined by the left arm 86 and right connection section 87.

The left load transmission member 182 also has a left front end portion 88 fastened to the left rear connection section 31 of the left sub side frame 41 by means of a bolt 151, a left apex portion 91 fastened to the left mounting section 38 of the left side sill 17 by means of a bolt 152, and a left rear end portion 92 fastened to the left mounting section 168 of the left rear front-side-frame end section 21 by means of a bolt 153.

The right load transmission member 183 has a right arm 94 interconnecting the right rear connection section 32 of the right sub side frame 42 and the right mounting section 39 of the right side sill 18, and a right connection section 95 interconnecting the right mounting section 39 of the right side sill 18 and the right mounting section 169 of the right rear front-side-frame end section 24. The right load transmission member 183 has a substantially L shape defined by the right arm 94 and right connection section 95.

The right load transmission member 183 has a right front end portion 96 fastened to the right rear connection section 32 of the right sub side frame 41 by means of a bolt 157, a right apex portion 97 fastened to the right mounting section 39 of the right side sill 18 by means of a bolt 158, and a left rear end portion 98 fastened to the right mounting section 169 of the right rear front-side-frame end section 21 by means of a bolt 159.

The cross member 184 spans between the left and right rear front-side-frame end sections 21 and 24. The cross member 184 has a left end portion 101 fastened to the left mounting section 168 of the left rear front-side-frame end section 21 by means of the bolt 153, and a right end portion 102 fastened to the right mounting section 169 of the right rear front-side-frame end section 24 by means of the bolt 159.

The bolt 153 fastens both of the left front end portion 92 of the left load transmission member 182 and left end portion 101 of the cross member 184 to the left mounting section 168 of the left rear front-side-frame end section 21. The bolt 159 fastens both of the right front end portion 98 of the right load transmission member 183 and right end portion 102 of the cross member 184 to the right mounting section 169 of the right rear front-side-frame end section 24.

The cross member 184 and the left and right connection sections 87 and 95 are disposed in a linear configuration. In this way, the rigidity of the front floor panel 19 fixed between the left and right side sills 17 and 18 can be enhanced by the cross member 184 and the left and right connection sections 87 and 95.

The left load transmission member (left arm 86 and left connection section 87) 182 and the left rear front-side-frame end section 21 together form the substantially triangular left rigid area 171 (see FIG. 7), and the right load transmission member (right arm 94 and right connection section 95) 183 and the right rear front-side-frame end section 24 together form the substantially triangular left rigid area 172 (see FIG. 7).

Thus, the third embodiment of the front vehicle body structure 180 can achieve the same advantageous benefits as the second embodiment of the front vehicle body structure 100.

Whereas the second and third embodiments 100 and 180 of the present invention have each been described above in relation to the case where the portion of the cross member 40 or 184 opposed to the front floor panel 19 is disposed at the same height as the mounting surface 168a of the left mounting section 168 and the mounting surface of the right mounting section 169, the shapes of the cross members 40 and 184 are not so limited. For example, the portion of the cross member 40 or 184 opposed to the front floor panel 19 may be raised up to the height of the front floor panel 19 so that the raised portion can be secured to the front floor panel 19 by fasteners, such as bolts, or by welding. With the raised portion of the cross member 40 or 184 secured to the front floor panel 19 like this, the rigidity of the front floor panel 19 can be even further enhanced.

The front vehicle body structure of the present invention is well suited for use in automotive vehicles including a front sub frame provided beneath left and right front side frames.

Obviously, various minor changes and modifications of the present invention are possible in light of the above teaching. It is therefore to be understood that within the scope of the appended claims the invention may be practice otherwise than as specifically described.

What is claimed is:

1. A front vehicle body structure comprising:
   left and right rear frames extending from respective rear end portions of left and right front side frames toward a rear of the vehicle body;
   left and right outriggers extending from the respective rear end portions of the left and right front side frames outwardly in a width direction of the vehicle body;
   left and right side sills extending from the left and right outriggers toward the rear of the vehicle body;
   a front sub frame having left front and rear connection sections and right front and rear connection sections fixedly connected to the left front side frame and left rear frame and to the right front side frame and right rear frame, respectively; and
   left and right load transmission members fixedly connected to the left rear connection section of said front sub frame, the left rear frame and the left side sill and to the right rear connection section of said front sub frame, the right rear frame and the right side sill, respectively, each of said left and right load transmission members being a substantially triangular frame defined by a first arm interconnecting the left or right rear connection section of said front sub frame and the left or right rear frame, a second arm interconnecting the left or right rear connection section of said front sub frame and the left or right side sill, and a third arm interconnecting the left or right side sill and the left or right rear frame,
   wherein each of said left and right load transmission members transmits an impact load, applied to a front of the vehicle, from the left or right rear connection section of said front sub frame to the left or right rear frame via the first arm and to the left or right side sill via the second arm.

2. The front vehicle body structure according to claim 1 wherein two of three apexes of each of the left and right load transmission members, fixedly connected to the left and right rear connection sections of said front sub frame, the left and right rear frames and the left and right side sills, are disposed on an imaginary input line of an impact load acting on said front sub frame.

3. The front vehicle body structure according to claim 1 wherein, in each of said left and right load transmission members, the first arm is disposed along the left or right rear frame, and the second arm is disposed along the left or right rear outrigger.

4. The front vehicle body structure according to claim 1 wherein each of the left and right rear connection sections is disposed at a same height as a mounting section of the left or right side sill where one of the apexes of said left or right load transmission member is mounted and as a mounting section of the left or right rear frame where another one of the apexes of said left or right load transmission member is mounted.

* * * * *